US011659488B2

(12) United States Patent
Morioka

(10) Patent No.: US 11,659,488 B2
(45) Date of Patent: *May 23, 2023

(54) INFORMATION PROCESSING DEVICE, INFORMATION PROCESSING METHOD, AND PROGRAM

(71) Applicant: Sony Group Corporation, Tokyo (JP)

(72) Inventor: Yuichi Morioka, Kanagawa (JP)

(73) Assignee: SONY GROUP CORPORATION, Toyko (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/520,731

(22) Filed: Nov. 8, 2021

(65) Prior Publication Data
US 2022/0060987 A1 Feb. 24, 2022

Related U.S. Application Data

(63) Continuation of application No. 16/511,015, filed on Jul. 15, 2019, now Pat. No. 11,191,019, which is a
(Continued)

(30) Foreign Application Priority Data

May 1, 2015 (JP) ................. 2015-093784

(51) Int. Cl.
H04W 52/02 (2009.01)
H04W 72/54 (2023.01)
(Continued)

(52) U.S. Cl.
CPC ... *H04W 52/0232* (2013.01); *H04W 52/0238* (2013.01); *H04W 52/0245* (2013.01);
(Continued)

(58) Field of Classification Search
None
See application file for complete search history.

(56) References Cited

U.S. PATENT DOCUMENTS 5,553,316 A 9/1996 Diepstraten et al.
8,837,968 B2 9/2014 Andoh et al.
(Continued)

FOREIGN PATENT DOCUMENTS

JP 2000-261462 A 9/2000
JP 2004-228930 A 8/2004
(Continued)

OTHER PUBLICATIONS

Takeshi Itagaki, et al., "Performance Analysis of BSS Colorand DSC," IEEE 802.11-14/1403r0, Nov. 2, 2014, (6 pages).
(Continued)

Primary Examiner — Jenkey Van
(74) Attorney, Agent, or Firm — Xsensus LLP

(57) ABSTRACT

Improvement of use efficiency of radio resources is realizable.

An information processing device is an information processing device which includes a reception unit and a control unit. The reception unit included in this information processing device is a reception unit which receives a packet. In addition, the control unit included in the information processing device is a control unit which controls a packet monitoring state of the information processing device in case of detection of reception of a packet not addressed to the information processing device. The packet monitoring state is controlled on the basis of reception power at the time of reception of the packet not addressed to the information processing device.

16 Claims, 9 Drawing Sheets

Related U.S. Application Data continuation of application No. 15/555,570, filed as application No. PCT/JP2016/058139 on Mar. 15, 2016, now Pat. No. 10,397,871.

(51) Int. Cl.
  *H04W 84/12* (2009.01)
  *H04W 16/14* (2009.01)
(52) U.S. Cl.
  CPC ............ *H04W 72/54* (2023.01); *H04W 16/14* (2013.01); *H04W 84/12* (2013.01); *Y02D 30/70* (2020.08)

(56) References Cited

U.S. PATENT DOCUMENTS

| | | | |
|---|---|---|---|
| 8,937,968 | B1 | 1/2015 | Venkatesh |
| 9,854,607 | B1 | 12/2017 | Chu et al. |
| 9,913,291 | B2 | 3/2018 | Li et al. |
| 10,045,340 | B1 | 8/2018 | Chu et al. |
| 2007/0264962 | A1 | 11/2007 | Ueno et al. |
| 2012/0207062 | A1 | 8/2012 | Corbellini et al. |
| 2014/0376453 | A1 | 12/2014 | Smith |
| 2015/0009879 | A1 | 1/2015 | Kim et al. |
| 2015/0282043 | A1 | 10/2015 | Fang et al. |
| 2016/0135225 | A1 | 5/2016 | Kwon et al. |
| 2016/0143058 | A1* | 5/2016 | Son .................. H04W 74/0816 370/329 |
| 2016/0150534 | A1* | 5/2016 | Kwon ............... H04W 72/0446 370/338 |
| 2016/0227489 | A1 | 8/2016 | Oteri et al. |
| 2016/0381688 | A1 | 12/2016 | Hedayat |
| 2017/0078887 | A1 | 3/2017 | Barriac et al. |
| 2017/0142659 | A1 | 5/2017 | Noh et al. |
| 2017/0208546 | A1 | 7/2017 | Park et al. |
| 2017/0289987 | A1* | 10/2017 | Seok .................... H04W 84/12 |
| 2018/0048427 | A1 | 2/2018 | Lou et al. |
| 2018/0270038 | A1 | 9/2018 | Oteri et al. |
| 2018/0376423 | A1 | 12/2018 | Atefi |
| 2018/0376460 | A1 | 12/2018 | Atefi |

FOREIGN PATENT DOCUMENTS

| | | | |
|---|---|---|---|
| JP | 4733735 B2 * | 7/2011 | .......... H04W 74/085 |
| JP | 2016540421 | * 12/2016 | |
| KR | 20170013251 | * 2/2017 | |

OTHER PUBLICATIONS

Takeshi Itagaki, et al., "Performance Analysis of BSS Color and DSC," IEEE 802.11-15/0045r0, Jan. 12, 2015, (7 pages).

Graham Smith, "Dynamic Sensitivity Control Practical Usage," IEEE 802.11-14/077r2, Jul. 2014, (16 pages).

Yasuhiko Inoue, et al., "Discussion on The Receiver Behavior for DSC/CCAC with BSS Color," IEEE 802.11-15/0595r2, May 11, 2015, (7 pages).

International Search Report dated May 24, 2016 in PCT/JP2016/058139 filed Mar. 15, 2016.

* cited by examiner

STATE TRANSITION EXAMPLE OF INFORMATION PROCESSING DEVICE

PACKET CONFIGURATION EXAMPLE

FIG. 4
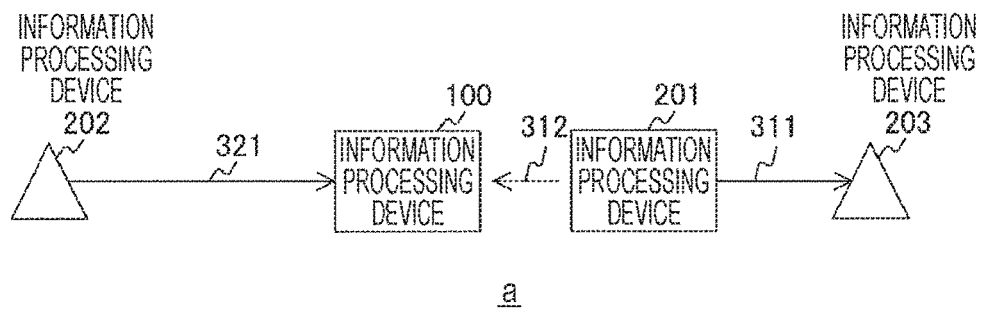
CONFIGURATION EXAMPLE OF COMMUNICATION SYSTEM
a
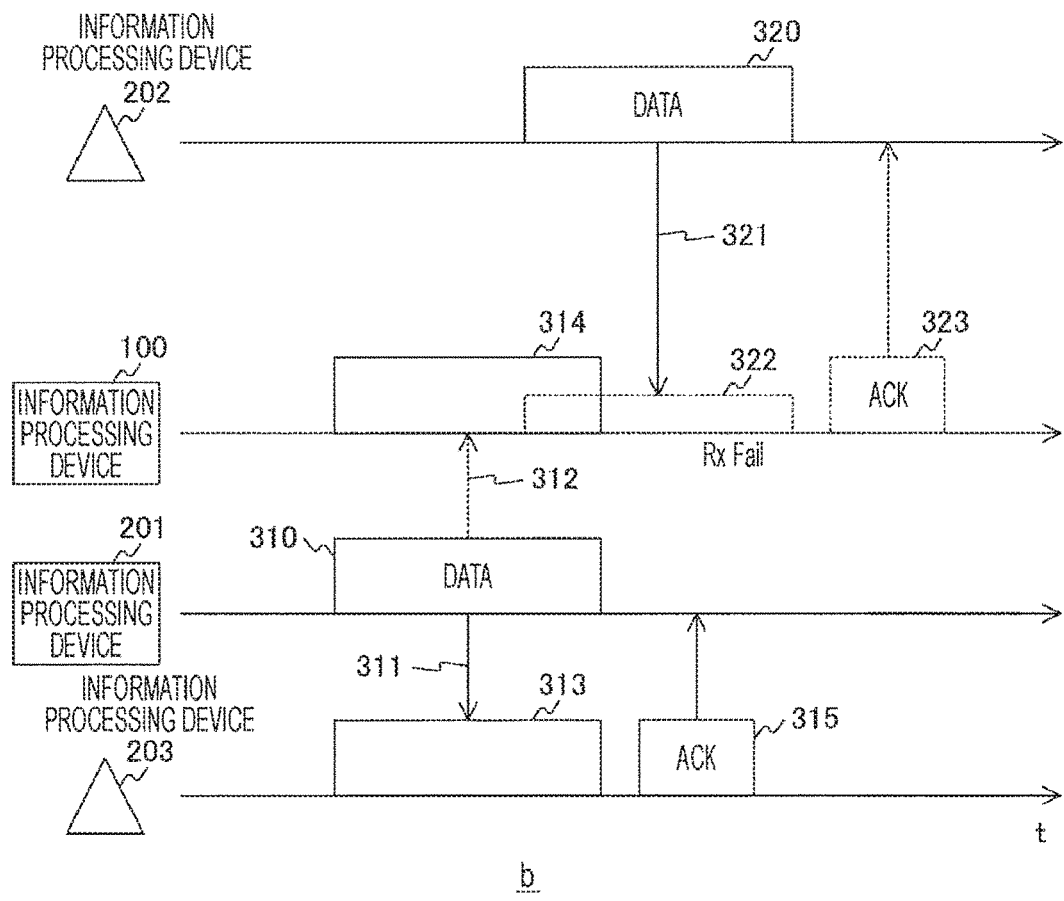
COMMUNICATION EXAMPLE BETWEEN RESPECTIVE DEVICES
b FIG. 5
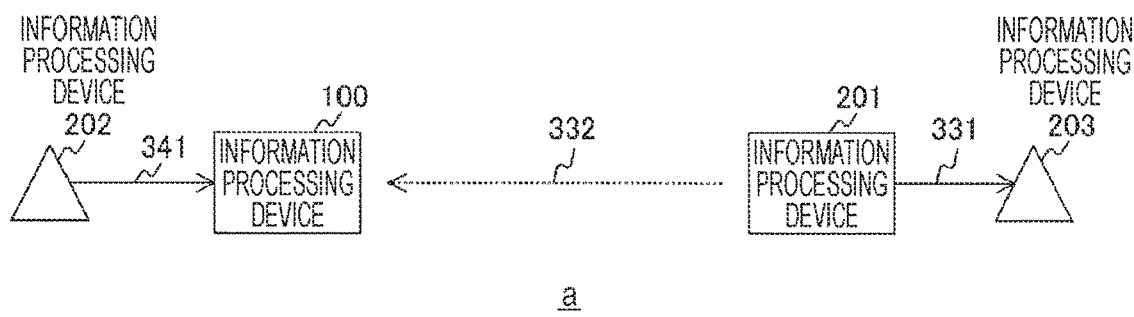
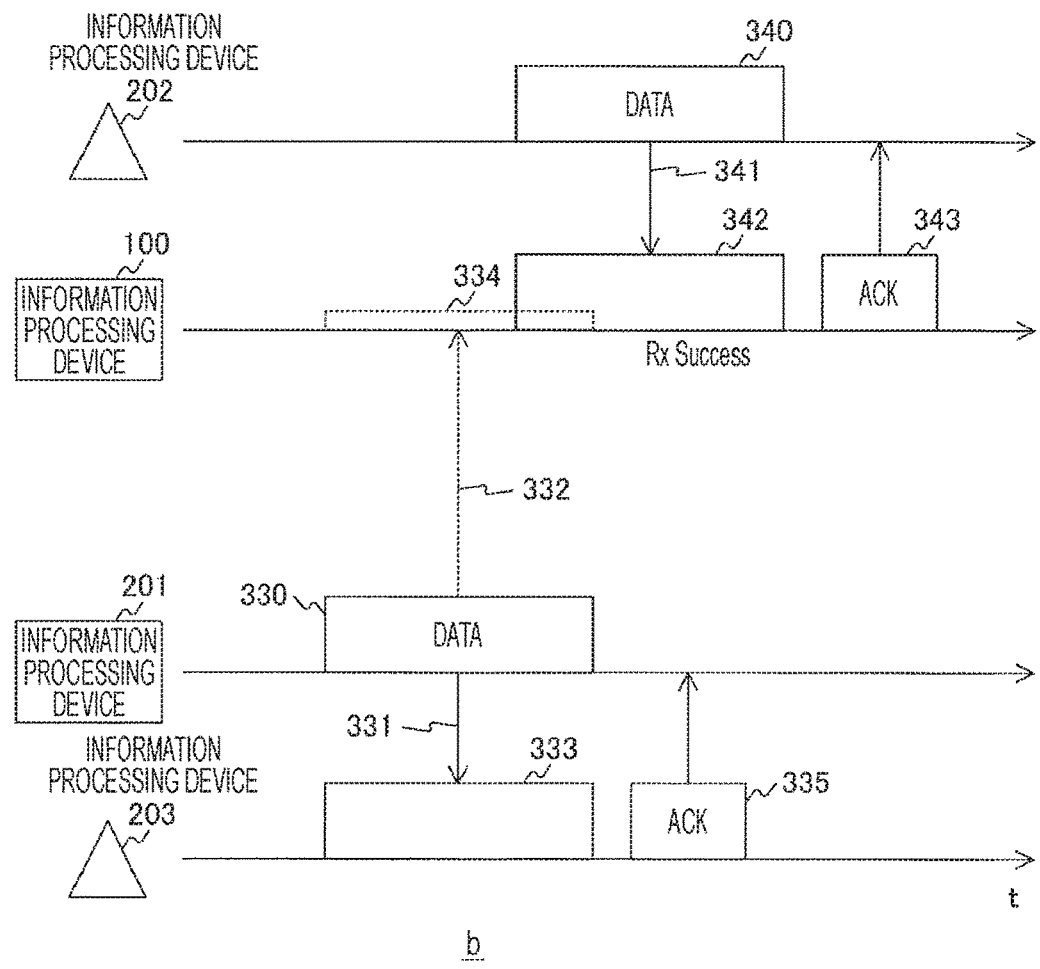

CONFIGURATION EXAMPLE OF Sleep DETERMINATION POWER THRESHOLD NOTIFICATION PACKET

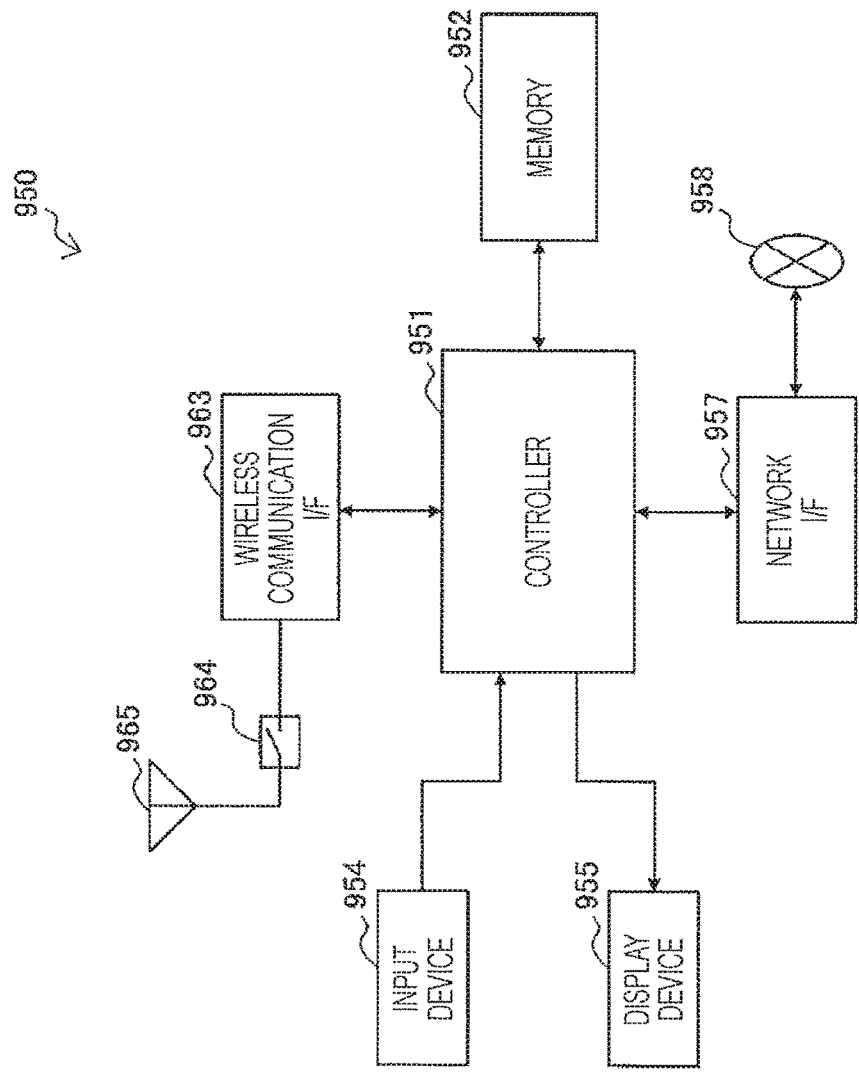

INFORMATION PROCESSING DEVICE, INFORMATION PROCESSING METHOD, AND PROGRAM

CROSS-REFERENCE TO RELATED APPLICATIONS

This application is a continuation of U.S. application Ser. No. 16/511,015, filed Jul. 15, 2019, which is a continuation of U.S. application Ser. No. 15/555,570, filed Sep. 5, 2017 (now U.S. Pat. No. 10,397,871), which is based on PCT filing PCT/JP2016/058139, filed Mar. 15, 2016, and claims priority to JP 2015-093784, filed May 1, 2015, the entire contents of each are incorporated herein by reference.

TECHNICAL FIELD

The present technology relates to an information processing device. More specifically, the present technology relates to an information processing device and an information processing method used for information exchange via wireless communication, and a program under which a computer executes this method.

BACKGROUND ART

There has been a wireless communication technology used for information exchange via wireless communication. For example, there has been proposed a communication method used for information exchange between information processing devices via a wireless local area network (LAN).

There has also been proposed an error detection method which detects whether or not received packet data contains an error. For example, an error detection method which detects an error by utilizing cyclic redundancy check (CRC) has been proposed. In case of detection of an error in a received packet, for example, the received packet is discarded. In case of detection of no error in a received packet, it is further determined whether or not the received packet has been addressed to an own-device which has received the packet. Then, in case of determination that the received packet has not been addressed to the own-device, the packet is discarded even if the packet has correct contents.

This error detection method requires demodulation of an entire packet up to a final part. In this case, the presence or absence of an error in data is determined after reception of the final part of the packet. Accordingly, even in case of an error contained in a media access control (MAC) header, or a packet containing no error in the MAC header but not addressed to the own-device, for example, error determination is made only after reception of the entire packet.

For overcoming this problem, there has been proposed a wireless packet communication system which additionally includes a field at an end of a header for protocol in a layer higher than a physical layer within a packet to store an error detection code for the header in the additional field, for example (e.g. see Patent Document 1).

In addition, Basic Service Set (BSS) Color has been introduced by Institute of Electrical and Electronic Engineers (IEEE) 802.11ah. This BSS Color may be used to determine the presence or absence of a possibility that a packet has been addressed to the own-device.

Furthermore, Dynamic Spectrum Sensing (DSC) technology has been proposed as a technology capable of improving use efficiency of radio resources (for example, see Patent Document 2).

CITATION LIST

Patent Document

Patent Document 1: Japanese Patent Application Laid-Open No. 2000-261462
Patent Document 2: U.S. Pat. No. 5,553,316

SUMMARY OF THE INVENTION

Problems to be Solved by the Invention

The conventional technology described above requires an additional field for storing an error detection code. Moreover, a wireless communication device unable to recognize the additional field may not correctly demodulate a received frame.

On the other hand, according to a method using BSS Color, for example, determination that packets have not been addressed to an own-device is made before reception of an entire packet. In this case, reception opportunities may increase in a period of a process for receiving a remaining part of the packet, for example. It is important to improve use efficiency of radio resources by increasing reception opportunities.

The present technology has been developed in consideration of these circumstances. It is an object of the present technology to improve use efficiency of radio resources.

Solutions to Problems

The present technology has been developed to solve the aforementioned problems. A first aspect of the present technology is directed to an information processing device, an information processing method for the information processing device, and a program under which a computer executes this method. The information processing device includes a reception unit that receives a packet, and a control unit that controls a packet monitoring state in case of detection of reception of a packet not addressed to the information processing device, the packet monitoring state being controlled on the basis of reception power of the packet. This configuration produces an effect of controlling the packet monitoring state in case of detection of reception of the packet not addressed to the information processing device. The packet monitoring state is controlled on the basis of reception power of the packet.

In addition, according to the first aspect, the control unit may control the packet monitoring state on the basis of a comparison result between the reception power of the packet not addressed to the information processing device and a predetermined threshold. This configuration produces an effect of controlling the packet monitoring state on the basis of the comparison result between the reception power of the packet not addressed to the information processing device and the predetermined threshold.

In addition, according to the first aspect, the control unit may determine the threshold on the basis of reception power of a reference signal received from a first device that transmits a packet addressed to the information processing device. This configuration produces an effect of determining the threshold on the basis of reception power of the reference signal received from the first device that transmits the packet addressed to the information processing device.

In addition, according to the first aspect, the control unit may determine the threshold by using a latest reference signal included in reference signals received from the first device, or a plurality of reference signals received from the first device. This configuration produces an effect of determining the threshold by using a latest reference signal included in reference signals received from the first device, or a plurality of reference signals received from the first device.

In addition, according to the first aspect, the control unit may determine the threshold by using a reference signal that has lowest reception power, or a reference signal that has highest reception power in case of presence of a plurality of the first devices. This configuration produces an effect of determining the threshold by using a reference signal that has lowest reception power, or a reference signal that has highest reception power in case of presence of a plurality of the first devices.

In addition, according to the first aspect, the control unit may determine the threshold by using at least any one of a battery residual amount of the information processing device, a volume of data handled by the information processing device, a type of the data, and a communication environment of the information processing device. This configuration produces an effect of determining the threshold by using at least any one of the battery residual amount of the information processing device, the volume of data handled by the information processing device, the type of the data, and the communication environment of the information processing device.

In addition, according to the first aspect, the control unit may update the threshold for every reception of the reference signal from the first device. This configuration produces an effect of updating the threshold for every reception of the reference signal from the first device.

In addition, according to the first aspect, the control unit may update the threshold in case of detection of movement of the information processing device or the first device. This configuration produces an effect of updating the threshold in case of detection of movement of the information processing device or the first device.

In addition, according to the first aspect, the control unit may bring the packet monitoring state into a sleep state for a period specified on the basis of a size of the packet not addressed to the information processing device in a case where reception power of the packet not addressed to the information processing device is high with respect to the threshold. This configuration produces an effect of bringing the packet monitoring state into the sleep state for the period specified on the basis of the size of the packet not addressed to the information processing device in the case where reception power of the packet not addressed to the information processing device is high with respect to the threshold.

In addition, according to the first aspect, the control unit may bring the packet monitoring state into the sleep state for at least a period until an end of the packet not addressed to the information processing device. This configuration produces an effect of bringing the packet monitoring state into the sleep state for at least the period until the end of the packet not addressed to the information processing device.

In addition, according to the first aspect, the control unit may bring the packet monitoring state into the sleep state for a period of a sum of a period until an end of the packet not addressed to the information processing device and a predetermined period. This configuration produces an effect of bringing the packet monitoring state into the sleep state for the period of the sum of the period until the end of the packet not addressed to the information processing device and the predetermined period.

In addition, according to the first aspect, the predetermined period may be a value that corresponds to any one of short inter frame space (short IFS) (SIFS), DCF IFS (DIFS), and a transmission period of a response signal for the packet not addressed to the information processing device. This configuration produces an effect that the predetermined period is any one of SIFS, DIFS, and the transmission period of the response signal for the packet not addressed to the information processing device.

In addition, according to the first aspect, the control unit may specify the end of the packet not addressed to the information processing device on the basis of length stored in a PHY header of the packet not addressed to the information processing device. This configuration produces an effect of specifying the end of the packet not addressed to the information processing device on the basis of length stored in the PHY header of the packet not addressed to the information processing device.

In addition, according to the first aspect, the control unit may detect the packet not addressed to the information processing device on the basis of Basic Service Set (BSS) Color contained in a PHY header of the received packet. This configuration produces an effect of detecting the packet not addressed to the information processing device on the basis of BSS Color contained in the PHY header of the received packet.

In addition, according to the first aspect, the control unit may notify a first device about the threshold, the first device transmitting a packet addressed to the information processing device. This configuration produces an effect of notifying the first device about the threshold. The first device transmits the packet addressed to the information processing device.

Effects of the Invention

The present technology produces an excellent advantage of improving use efficiency of radio resources. Note that advantages to be offered are not limited to the aforementioned advantages, but may be any of advantages described in the present disclosure.

BRIEF DESCRIPTION OF DRAWINGS

FIG. 4 is a diagram showing an example of packet communication exchanged between respective devices according to the embodiment of the present technology.

FIG. 5 is a diagram showing an example of packet communication exchanged between the respective devices according to the embodiment of the present technology.

FIG. 11 is a block diagram showing an example of a general configuration of a wireless access point.

MODES FOR CARRYING OUT THE INVENTION

Modes for carrying out the present technology (hereinafter referred to as embodiments) are described hereinbelow. The description is presented in the following order.

1. Embodiment (example of packet monitoring state control based on reception power of packet not addressed to own-device)
2. Application Example

1. Embodiment

[Functional Configuration Example of Information Processing Device]

Figure 1:
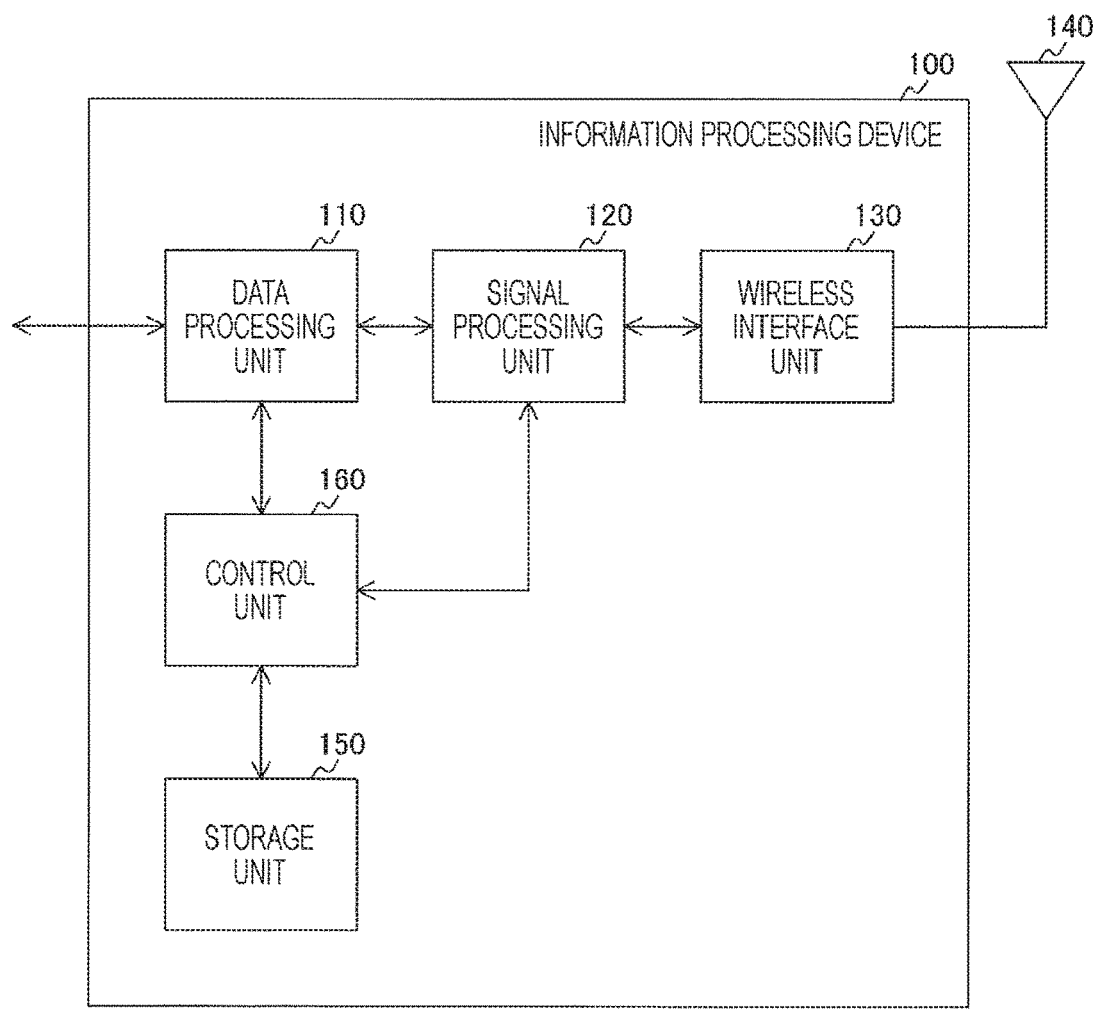
FIG. 1 is a block diagram showing a functional configuration example of an information processing device 100 according to an embodiment of the present technology.

FIG. 1 is a block diagram showing a functional configuration example of an information processing device 100 according to an embodiment of the present technology.

The information processing device 100 includes a data processing unit 110, a signal processing unit 120, a wireless interface unit 130, an antenna 140, a storage unit 150, and a control unit 160.

For example, the information processing device 100 may be constituted by a stationary or portable information processing device having a wireless communication function. For example, the stationary information processing device herein is an information processing device such as an access point of a wireless local area network (LAN) system, or abase station. On the other hand, for example, the portable information processing device is an information processing device such as a smartphone, a cellular phone, or a tablet-type terminal.

It is also assumed that the information processing device 100 has a communication function in conformity with wireless LAN standards of Institute of Electrical and Electronic Engineers (IEEE) 802.11, for example. The wireless LAN may be a network utilizing wireless fidelity (Wi-Fi), Wi-Fi Direct, or Wi-Fi CERTIFIED Miracast specification (technical specification name: Wi-Fi Display). Alternatively, the information processing device 100 may perform wireless communication utilizing other communication systems.

The data processing unit 110 is configured to process various types of data under control by the control unit 160. For example, the data processing unit 110 performs a process for adding a media access control (MAC) header, an error detection code and the like to data received from an upper layer to generate a packet for wireless transmission. The data processing unit 110 subsequently supplies the generated packet to the signal processing unit 120.

Moreover, for example, the data processing unit 110 performs header analysis, a packet error detection process and the like for a bit string received from the signal processing unit 120 at the time of data reception, and supplies processed data to the upper layer. For example, the data processing unit 110 also notifies the control unit 160 about a header analysis result, a packet error detection result and the like.

The signal processing unit 120 is configured to perform various types of signal processing under control by the control unit 160. For example, the signal processing unit 120 encodes input data received from the data processing unit 110 on the basis of coding and a modulation scheme set by the control unit 160, and adds a preamble and a physical layer (PHY) header to the encoded input data at the time of transmission. The signal processing unit 120 subsequently supplies a transmission symbol stream obtained by the signal processing to the wireless interface unit 130.

Moreover, for example, the signal processing unit 120 detects a preamble and a PHY header from a reception symbol stream received from the wireless interface unit 130, decodes the reception symbol stream, and supplies the decoded reception symbol stream to the data processing unit 110 at the time of reception. For example, the signal processing unit 120 further notifies the control unit 160 about a PHY header detection result and the like.

The wireless interface unit 130 is an interface connected with other information processing devices via wireless communication to transmit and receive various types of information. For example, the wireless interface unit 130 converts input from the signal processing unit 120 into analog signals, amplifies and filters the analog signals, and up-converts the analog signals to a predetermined frequency to transmit the up-converted analog signals to the antenna 140 at the time of transmission.

Moreover, for example, the wireless interface unit 130 performs reversed processes for input from the antenna 140, and supplies a processing result to the signal processing unit 120 at the time of reception. Note that the wireless interface unit 130 is an example of a reception unit according to the appended claims.

The storage unit 150 functions as a work area for data processing by the control unit 160, and as a recording medium for retaining various types of data. The storage unit 150 may be constituted by a storage medium such as a non-volatile memory, a magnetic disk, an optical disk, and a magneto-optical (MO) disk, for example. Note that the non-volatile memory may be an electrically erasable programmable read-only memory (EEPROM) or an erasable programmable ROM (EPROM), for example. In addition, the magnetic disk may be a hard disk or a disc-shaped magnetic-body disk, for example. In addition, the optical disk may be a compact disk (CD), a digital versatile disc recordable (DVD-R), or a Blu-Ray disc (BD (registered trademark)), for example.

The control unit 160 is configured to control a reception operation and a transmission operation of each of the data processing unit 110 and the signal processing unit 120. For example, the control unit 160 performs information passing between units, communication parameter setting, and packet scheduling of the data processing unit 110.

For example, the control unit 160 controls a packet monitoring state (e.g. state shown in FIG. 2) on the basis of reception power of a packet in case of detection of reception of a packet not addressed to the own-device (information processing device 100). In this case, the control unit 160 may control the packet monitoring state on the basis of a comparison result between the reception power of the packet not addressed to the own-device, and a threshold (e.g. sleep determination power threshold shown in FIG. 6).

[State Transition Example of Information Processing Device]

Figure 2:
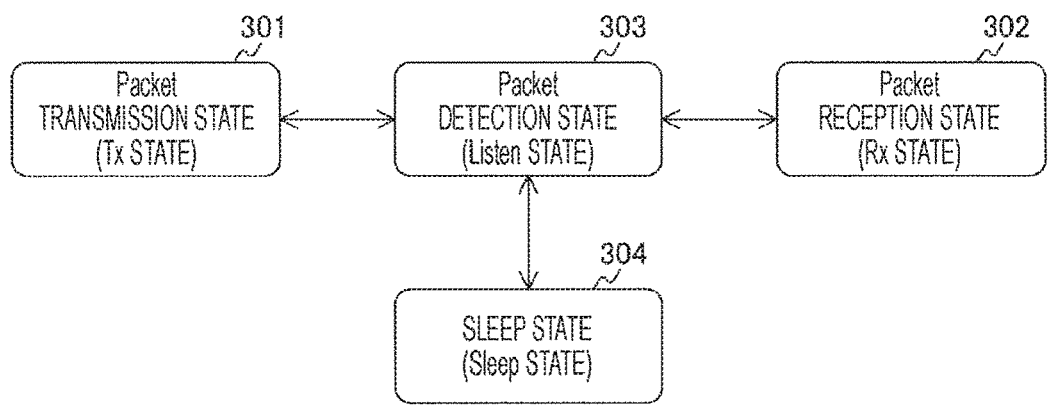
FIG. 2 is a diagram schematically showing a state transition example of the information processing device 100 according to the embodiment of the present technology.

FIG. 2 is a diagram schematically showing a state transition example of the information processing device 100 according to the embodiment of the present technology.

Presented in the embodiment of the present technology is an example in which the information processing device 100 shifts to any one of a packet transmission state (Tx state) 301, a packet reception state (Rx state) 302, a packet detection state (listen state) 303, and a sleep state 304.

Each of the packet transmission state 301 and the packet reception state 302 is such a state that all of the data processing unit 110, the signal processing unit 120, the wireless interface unit 130, and the control unit 160 operate in linkage with each other. Accordingly, a relatively large amount of power is consumed by the information processing device 100. For example, the packet transmission state 301 is often a most high power consumption state requiring operation of a signal amplifier (power amplifier).

Each of the packet detection state 303 and the sleep state 304 is a packet monitoring state.

The packet detection state 303 is such a state that a preamble detection section in each of the wireless interface unit 130 and the signal processing unit 120 operates. In addition, the data processing unit 110 awakens once a preamble is detected in the packet detection state 303. As a result, the packet detection state 303 shifts to the packet reception state 302. Furthermore, power consumption in the packet detection state 303 is smaller than power consumption in each of the packet transmission state 301 and the packet reception state 302.

Figure 6:
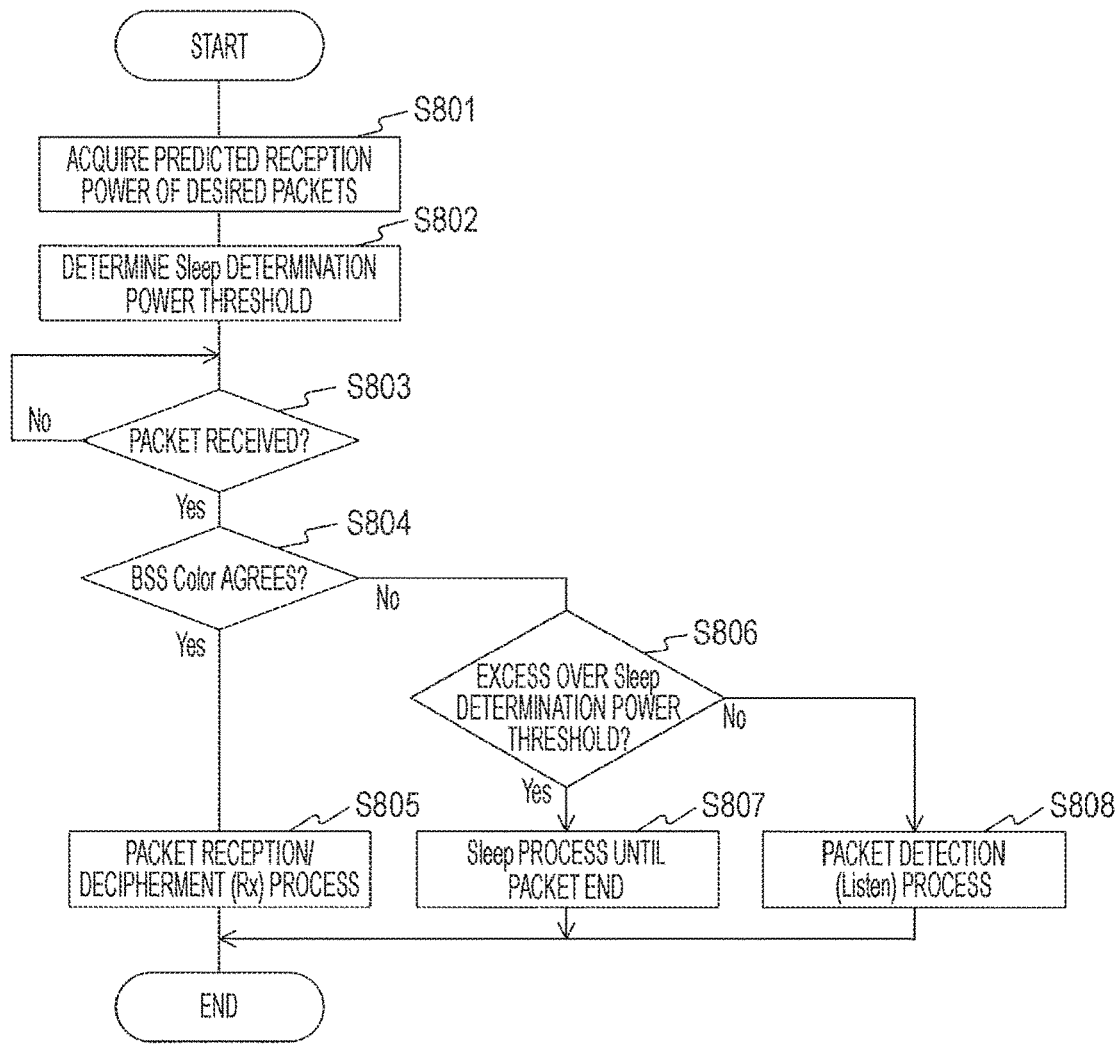
FIG. 6 is a flowchart showing an example of processing procedures of a packet monitoring process performed by the information processing device 100 according to the embodiment of the present technology.

The sleep state 304 is such a state that only the control unit 160 operates. Accordingly, power consumption in the sleep state 304 is lowest in the four states described above. In addition, transition to the sleep state 304 is made in a case where a particular condition is met after detection of a preamble in the packet detection state 303. FIG. 6 shows this transition example.

[Packet Configuration Example]

Figure 3:
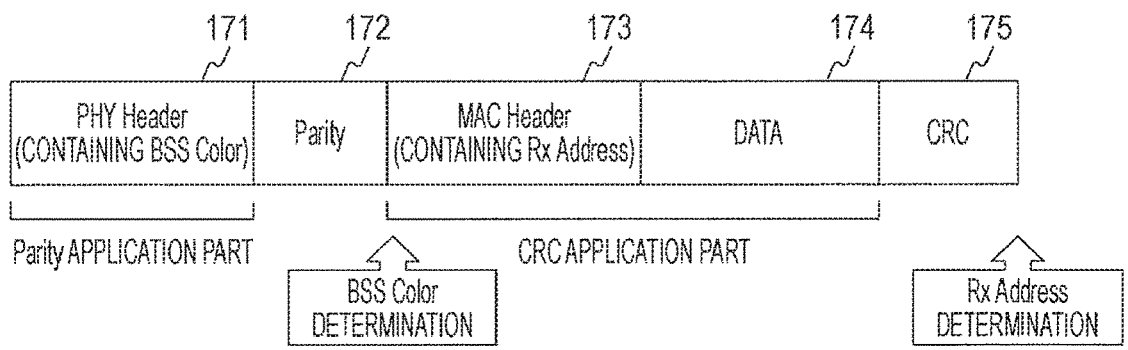
FIG. 3 is a diagram showing a configuration example of a packet to be transmitted or received by the information processing device 100 according to the embodiment of the present technology.

FIG. 3 is a diagram illustrating a configuration example of a packet to be transmitted or received by the information processing device 100 according to the embodiment of the present technology.

The packet is constituted by a PHY header 171, Parity 172, an MAC header 173, DATA 174, and a cyclic redundancy check (CRC) 175.

The PHY header 171 stores basic service set (BSS) Color and Length. Note that a network constituted by an information processing device functioning as an access point (AP) (master station) is referred to as BSS in the description.

BSS Color is information introduced by IEEE802.11ah. For example, an AP declares unique BSS Color for each BSS, describes this BSS Color in the PHY header 171 of a packet, and transmits the packet. A device having received the packet is capable of determining whether or not the received packet is a packet for own-BSS (i.e., presence or absence of a possibility that the packet has been addressed to the own-device). In this case, the presence or absence of the possibility that the packet has been addressed to the own-device is determined on the basis of an introduction part of the packet. Accordingly, in case of reception of a packet addressed to a different device (packet not addressed to own-device), processes after the reception are omitted to reduce power consumption for reception.

Length is information for specifying a length of a packet.

The MAC header 173 stores a destination address (Rx Address). The MAC header 173 may further store CRC. In case of the MAC header 173 storing CRC, the destination is determinable with reference to a head part of the packet.

For example, suppose that an error detection method using the CRC 175 is adopted to detect whether or not received packet data contains an error. According to this method, a received packet is discarded in case of detection of an error in the packet, for example. On the other hand, in case of detection of no error in a received packet, the MAC header 173 is read to determine whether or not the packet has been addressed to the own-device. In a case where it is determined that the packet has not been addressed to the own-device, the received packet is discarded regardless of correctness of contents of the packet.

According to this error detection method, not only the MAC header but also the entire packet up to the final part need to be demodulated. In this case, the presence or absence of an error in data is determined after reception of the final part of the packet. Accordingly, determination is made only after reception of the entire packet even in case of the packet containing an error in the MAC header, and the packet containing no error in the MAC header but not addressed to the own-device, for example.

On the other hand, according to a method using BSS Color stored in the PHY header 171, a received packet not addressed to the own-device is determinable with reference to a head part of the packet. In addition, according to a method using CRC stored in the MAC header 173, a received packet not addressed to the own-device is determinable with reference to apart of the MAC header 173. According to these methods, a process for receiving a remaining part of a packet not addressed to the own-device need not be performed.

As described above, a packet not addressed to the own-device is determinable before reception of the entire packet. For example, suppose that a process for receiving a remaining part of a packet is not performed in accordance with determination based on BSS Color that the packet has not been addressed to the own-device. In this case, it is important to improve use efficiency of radio resources by increasing reception opportunities in a period for receiving the remaining part of the packet. For example, suppose that reception power of a packet not addressed to the own-device is sufficiently low, and that reception power of a desired packet (packet addressed to own-device) is sufficiently high. In this case, the information processing device 100 may shift to the packet detection state (listen state) 303 (shown in FIG. 2) in the period of the packet not addressed to the own-device to increase reception opportunities. As a result of this shift, system throughput is expected to improve.

Accordingly, presented in the embodiment of the present technology is an example which increases reception opportunities in a period of a packet not addressed to the own-device to improve system throughput.

[Packet Communication Example]

FIGS. 4 and 5 illustrate a packet communication example between respective devices according to the embodiment of the present technology.

A simplified configuration example constituted by the information processing device 100, an information processing device 201, an information processing device 202, and an information processing device 203 is shown in each of a of FIG. 4 and a of FIG. 5.

A flow of packets exchanged between the information processing device 100, the information processing device 201, the information processing device 202, and the information processing device 203 is schematically shown in each of b of FIG. 4 and b of FIG. 5.

Rectangles 310, 315, 320, and 323 schematically indicate transmitted packets, while rectangles 313, 314, 322, 333, 334, and 342 schematically indicate received packets (or packets to be received later) in b of FIG. 4 and b of FIG. 5. Moreover, arrows 311, 312, 321, 331, 332, and 341 schematically indicate flows of transmitted packets. Note that a part of rectangles and arrows indicating acknowledgment (ACK) is not shown.

In addition, each horizontal axis in each of b of FIG. 4 and b of FIG. 5 represents a time axis. Each height (length in vertical direction) of the rectangles indicating packets at a receiving device represents reception power of the corresponding received packet (reception signal intensity).

In addition, according to the example illustrated in FIG. 4, the information processing device 100 and the information processing device 201 are located relatively close to each other, while the information processing device 100 and the information processing device 202 are located relatively far from each other. On the other hand, according to the example illustrated in FIG. 5, the information processing device 100 and the information processing device 201 are located relatively far from each other, while the information processing device 100 and the information processing device 202 are located relatively close to each other.

In addition, according to the examples illustrated in FIGS. 4 and 5, each of the information processing device 202 and the information processing device 203 indicated by a triangle functions as an AP (master station), while each of the information processing device 100 and the information processing device 201 indicated by a rectangle functions as a subsidiary device (slave station) of the corresponding AP. More specifically, it is assumed that the information processing device 100 functions as a subsidiary device (slave station) of the information processing device 202, and that the information processing device 201 functions as a subsidiary device (slave station) of the information processing device 203. Accordingly, FIGS. 4 and 5 illustrate examples of a communication system constituted by combinations of one access point and one subsidiary device.

Note that target system configurations according to the embodiment of the present technology are not limited to these specific examples. For example, while each of FIGS. 4 and 5 illustrates an example of a communication system constituted by combinations of one access point and one subsidiary device, the number of access points and subsidiary devices are not limited to these values. For example, the embodiment of the present technology is applicable to a communication system constituted by combinations of one access point and a plurality of subsidiary devices. Alternatively, for example, the embodiment of the present technology is also applicable to a network where a plurality of devices are mutually connected to each other via one-to-one wireless communication between the plurality of devices (e.g. mesh network and ad hoc network).

FIG. 4 illustrates an example in which packets addressed to the own-device (desired packets) is difficult to receive by the information processing device 100.

For example, suppose that the information processing device 202 transmits data 320 to the information processing device 100 (321) after transmission of data 310 from the information processing device 201 to the information processing device 203 (311). Further assumed in the description is that the data 310 is referred to as a packet addressed to a different device (packet not addressed to own-device), and that the data 320 is a desired packet (packet addressed to own-device) on the basis of the information processing device 100.

In this case, the information processing device 100 also receives the data 310 from the information processing device 201 located relatively close to the information processing device 100 (312, 314). The data 310 is a packet addressed to a different device different from the information processing device 100, and therefore becomes an interfering wave for the information processing device 100. In addition, reception power of the data 310 is high (314) in the state that the information processing device 201 and the information processing device 100 are located relatively close to each other.

On the other hand, reception power of the data 320 is low (322) in case of transmission of the data 320 to the information processing device 100 from the information processing device 202 located relatively far from the information processing device 100 (321). In this case, decoding of the desired packet (packet 322) may be difficult even if reception of the desired packet is attempted by the information processing device 100. In this case, transmission of the ACK 323 from the information processing device 100 becomes difficult.

In case of high reception power of a packet addressed to the different device corresponding to an interfering wave (data 314) and low reception power of a desired packet (data 322) as in this example, decoding of a desired packet may be difficult even if reception of the desired packet is attempted. In this case, transition to the sleep state 304 (shown in FIG. 2) contributes to reduction of the power consumption of the information processing device 100 which has received the packet addressed to the different device and having high reception power.

FIG. 5 illustrates an example of success achieved by the information processing device 100 in receiving a packet addressed to the own-device (desired packet).

For example, suppose that the information processing device 202 transmits data 340 to the information processing device 100 (341) after transmission of data 330 from the information processing device 201 to the information processing device 203 (331). Further assumed in the description is that the data 330 is referred to as a packet addressed to a different device (packet not addressed to own-device), and that the data 340 is a desired packet (packet addressed to own-device) on the basis of the information processing device 100.

In this case, the information processing device 100 also receives the data 330 from the information processing device 201 (332, 334). However, reception power of the data 330 is low in the state that the information processing device 100 and the information processing device 201 are located relatively far from each other (334).

In addition, in case of transmission of the data 340 from the information processing device 202 to the information processing device 100 (341), reception power of the data 340 is high in the state that the information processing device 100 and the information processing device 202 are located relatively close to each other (342). In this case, a desired packet (packet 342) may be decodable at the time of reception of the desired packet attempted by the information processing device 100. In this case, the information processing device 100 is capable of transmitting the ACK 343.

As described above, decoding of the desired packet (data 342) may be allowed even during transmission of the packet (data 334) addressed to the different device and corresponding to an interfering wave on the assumption that sufficiently low reception power of the packet addressed to the different device and sufficiently high reception power of the desired packet (data 342) are expected. In this case, it is considered that transition to the packet detection state (listen state) 303 (shown in FIG. 2) contributes to improvement of system throughput of the information processing device 100 which has received the packet addressed to the different device and having low reception power.

It is therefore important to appropriately select the state of the information processing device 100 on the basis of a relationship between reception power of a packet addressed to a different device and corresponding to an interfering wave (data 314, 334), and reception power of a desired packet (data 322, 342). Accordingly, described hereinafter is an example of selection of the state of the information processing device 100 on the basis of the relationship between reception power of a packet addressed to a different device and corresponding to an interfering wave, and reception power of a desired packet.

[Operation Example of Information Processing Device]

FIG. 6 is a flowchart showing an example of processing procedures of a packet monitoring process performed by the information processing device 100 according to the embodiment of the present technology. FIG. 6 shows an example that an initial state of the information processing device 100 is the packet detection state 303 shown in FIG. 2.

Initially, the control unit 160 of the information processing device 100 acquires predicted reception power of a desired packet (packet addressed to own-device) (step S801).

For example, in case of the information processing device 100 constituting a slave station, the control unit 160 is capable of acquiring predicted reception power of a desired packet transmitted from a master station connected to the information processing device 100 on the basis of a reference signal (such as beacon) transmitted from the master station. For example, reception power of a beacon (latest beacon) received immediately before (or value calculated on the basis of beacon) may be designated as predicted reception power. In addition, for example, average reception power of beacons in a certain period (or value calculated on the basis of average) may be designated as predicted reception power of a desired packet. In this case, an average may be calculated with lowered degrees of importance of old beacons, and raised degrees of importance of new beacons.

On the other hand, in case of the information processing device 100 constituting a master station, for example, the control unit 160 is capable of calculating predicted reception power of a desired packet received from one of a plurality of slave stations connected to the own-device on the basis of a reference signal transmitted from the corresponding slave station. In this case, for example, the reference signal may be a certain data signal transmitted from each of the slave stations. For example, average reception power of reference signals of the respective slave stations (latest reference signals) received immediately before for each slave station (or value calculated on the basis of average) may be designated as predicted reception power of a desired packet. Alternatively, for example, average reception power of reference signals of the respective slave stations received in a certain period for each slave station (or value calculated on the basis of average) may be designated as predicted reception power of a desired packet. In these cases, for example, reference signals from all slave stations may be handled equally, or degrees of importance of reference signals may be varied for each slave station to calculate predicted reception power of a desired packet. For example, the degrees of importance may be determined in accordance with transmission frequencies of respective slave stations. For example, the degrees of importance of reception power of slave stations more frequently transmitting packets may be raised, while the degrees of importance of reception power of slave stations less frequently transmitting packets may be lowered.

In addition, in case of a reference signal including description of an actual transmission power level, for example, predicted reception power of a desired packet may be acquired on the basis of the transmission power level described in the reference signal.

A device which performs transmission power control herein may switch transmission power for each transmission destination during packet transmission. For example, a master station may switch transmission power for each slave station during packet transmission, rather than equalize packet transmission for each slave station. Moreover, a master station may increase transmission power to allow respective slave stations to receive beacons during transmission. In this case, a transmission device may store actual transmission power in a packet to be transmitted at the time of transmission to notify a transmission destination of the packet about the actual transmission power. Accordingly, a reception device receiving the packet is capable of recognizing a range supported by the transmission device.

Thereafter, the control unit 160 determines a sleep determination power threshold on the basis of the predicted reception power of the desired packet (step S802). For example, the sleep determination power threshold is determination information used for determining whether to transit to the sleep state 304 shown in FIG. 2 at the time of detection of a packet addressed to a different device.

For example, the control unit 160 may calculate the sleep determination power threshold on the basis of the predicted reception power of the desired packet, and on reception performance of the information processing device 100 (e.g. resistance to interfering wave). For example, predetermined calculation may be performed for the predicted reception power of the desired packet and the reception performance of the information processing device 100 to calculate the sleep determination power threshold.

The reception performance herein is a characteristic peculiar to the device. For example, the reception performance collectively refers to an analog characteristic (e.g. noise figure) variable in accordance with performance of an antenna and an amplifier, and performance in digital processing (e.g. channel estimation).

In case of the information processing device 100 constituting a slave station, for example, reception power of a desired packet received from a master station connected to the information processing device 100 is expected to be high in a state that reception power of a beacon from the master station is high. In this case, it is highly probable that the desired packet is decodable even under a relatively high-level interfering wave. Accordingly, the sleep determination power threshold may be set to a high value in case of high reception power of a beacon from the master station.

In addition, in case of the information processing device 100 constituting a slave station, for example, reception power of a desired packet received from a master station connected to the information processing device 100 is expected to be low in a state that reception power of a beacon from the master station is low. In this case, it is highly probable that the desired packet is not decodable under a relatively high-level interfering wave. Accordingly, transition to the sleep state 304 (shown in FIG. 2) is preferable even under a low-level interfering wave in case of low reception power of a beacon from the master station. Accordingly, the sleep determination power threshold may be set to a low value in case of low reception power of a beacon from the master station.

On the other hand, in case of the information processing device 100 constituting a master station, for example, the sleep determination power threshold may be set on the basis of a slave station indicating lowest reception power to allow easy transmission to the sleep state 304 (shown in FIG. 2). In addition, in case of the information processing device 100 constituting a master station, for example, the sleep determination power threshold may be set on the basis of a slave station indicating highest reception power to allow easy transition to the packet detection state (listen state) 303 (shown in FIG. 2). In this case, system throughput is adjustable to higher throughput.

Alternatively, the sleep determination power threshold may be set on the basis of other determination references. For example, in case of the information processing device 100 constituted by a portable device (e.g. mobile device), the sleep determination power threshold may be adjusted on the basis of a battery residual amount of the information processing device 100. In a case where the battery residual amount of the information processing device 100 is small with respect to a threshold, the sleep determination power threshold may be lowered to allow easy transition to the sleep state 304 (shown in FIG. 2).

Alternatively, for example, the sleep determination power threshold may be adjusted on the basis of data handled by the information processing device 100 (e.g., data volume and traffic status). In case of a large volume of data relayed by the information processing device 100 functioning as a relay, for example, it is considered that transition to the sleep state 304 (shown in FIG. 2) is not preferable. Accordingly, in case of a large volume of data handled by the information processing device 100, the sleep determination power threshold is raised to prevent easy transition to the sleep state 304 (shown in FIG. 2).

Alternatively, for example, the sleep determination power threshold may be adjusted on the basis of a communication environment of the information processing device 100 (e.g. reception frequency, congestion level, number of connected devices, and number of adjacent BSS), types of data handled by the information processing device 100 (e.g. degree of priority and degree of importance), and others. In addition, for example, the sleep determination power threshold may be determined on the basis of a combination of two or more of the plurality of determination references described above.

As described above, the control unit 160 may determine the sleep determination power threshold on the basis of reception power of a reference signal from a first device which transmits a packet addressed to the own-device (e.g. communication partner of information processing device 100). In this case, for example, the control unit 160 may determine the sleep determination power threshold on the basis of the latest reference signal in the reference signals received from the first device, or a plurality of the reference signals received from the first device. In addition, in case of presence of a plurality of the first devices, for example, the control unit 160 may determine the sleep determination power threshold on the basis of the reference signal indicating the lowest reception power, or the reference signal indicating the highest reception power. Furthermore, for example, the control unit 160 may determine the sleep determination power threshold on the basis of at least any one of a battery residual amount of the information processing device 100, a data volume of data handled by the information processing device 100, a type of the data, and a communication environment of the information processing device 100.

Thereafter, the control unit 160 determines whether or not a packet has been received (step S803). In case of determination that no packet has been received (step S803), monitoring continues.

In case of determination that a packet has been received (step S803), the control unit 160 acquires BSS Color stored in the PHY header 171 (shown in FIG. 3) of the received packet. The control unit 160 subsequently determines whether or not an acquired value of BSS Color agrees with a value of BSS Color of BSS to which the own-device belongs (step S804). Note that the information processing device 100 retains the value of BSS Color of BSS to which the own-device belongs beforehand with reference to notification from a master station of BSS to which the own-device belongs. Note that step S804 is an example of a detection procedure according to the appended claims.

Incase of agreement between both the values of BSS Color (step S804), it is considered that the packet is a packet addressed to BSS to which the information processing device 100 belongs. In this case, there is a possibility that the packet has been addressed to the own-device. Accordingly, the control unit 160 shifts to the packet reception state 302 shown in FIG. 2 to perform a packet reception/decipherment process (step S805). As a result, whether or not the packet has been addressed to the own-device is determinable.

Note that, while FIG. 6 shows an example of determination that the received packet is not a packet addressed to the own-device by using BSS Color stored in the PHY header 171, this determination may be made by using other information. For example, in case of the MAC header 173 storing CRC, the determination that the received packet is not a packet addressed to the own-vehicle may be made on the basis of a head part of the packet by using CRC. In these cases, a process for receiving a remaining part of the packet need not be performed.

In case of disagreement between both the values of BSS Color (step S804), the packet is not a packet addressed to BSS to which the information processing device 100 belongs. In this case, there is no possibility that the packet is a packet addressed to the own-device. Accordingly, the control unit 160 determines whether or not reception power of the received packet exceeds the sleep determination power threshold (step S806).

In case of excess of the reception power of the packet over the sleep determination power threshold (step S806), the control unit 160 shifts to the sleep state 304 shown in FIG. 2 to perform a sleep process until an end of the received packet (step S807). In other words, the state shifts to the sleep state 304 shown in FIG. 2 to come into a sleep period until the end of the received packet. This sleep period is a sleep period provided for each packet, and recognized as a micro sleep, for example.

Note that a packet length is acquired with reference to Length stored in the PHY header 171 shown in FIG. 3.

In addition, while the example of the sleep period presented herein is an example period continuing until an end of a received packet (period based on length of received packet), other periods may be defined as the sleep period. For example, the sleep period may be a sum of a period until an end of a received packet and a period of short inter frame space (short IFS) (SIFS). Alternatively, for example, the sleep period may be a sum of a period until an end of the received packet and a period of DCF IFS (DIFS).

In addition, for example, a time until ACK transmission may be recognizable without a need of deciphering text of the received packet. In this case, the sleep period may be a period until ACK transmission.

In case of no excess of the reception power of the packet over the sleep determination power threshold (step S806), the control unit 160 shifts to the packet detection state 303 shown in FIG. 2 to monitor reception of a packet (step S808). Note that steps S806 through S808 correspond to an example of a control procedure according to the appended claims.

As described above, the control unit 160 is capable of detecting reception of a packet not addressed to the own-device on the basis of BSS Color stored in the PHY header 171 (shown in FIG. 3) of the received packet. Then, in case of detection of reception of a packet not addressed to the own-device, the control unit 160 controls a packet monitoring state on the basis of the reception power of the packet. In this case, the control unit 160 controls the packet monitoring state on the basis of a comparison result between the reception power of packet not addressed to the own-device and the sleep determination power threshold.

In addition, in case of excess of the reception power of the packet not addressed to the own-device over the sleep determination power threshold, the control unit 160 shifts the packet monitoring state to the sleep state 304 (shown in FIG. 2) for a period specified in accordance with a size of the packet to come into a sleep state. For example, the period specified in accordance with the size of the packet not addressed to the own-device herein may be a sum of a period until an end of the packet not addressed to the own-device, and a predetermined period. For example, the predetermined period may be any one of SIFS, DIFS, and a transmission period of a response signal for the packet not addressed to the own-device (e.g. transmission period of ACK).

In addition, the control unit 160 may specify an end of a packet not addressed to the own-device with reference to Length stored in the PHY header 171 (shown in FIG. 3) of the packet.

In addition, the control unit 160 may control a packet detection state on the basis of a result of comparison between reception power of a packet addressed to a different device and predicted reception power of a desired packet (e.g. ratio of one reception power to the other reception power) at the detection timing of the packet addressed to the different device in wireless packet communication. For example, in a case where the "(predicted reception power of desired packet)/(reception power of packet addressed to different device)" is a sufficiently large value, the packet detection state (listen state) 303 shown in FIG. 2 may be set to increase reception opportunities. On the other hand, in a case where the "(predicted reception power of desired packet)/(reception power of packet addressed to different device)" is a small value, for example, the sleep state 304 shown in FIG. 2 may be set to reduce power consumption.

Figure 8:
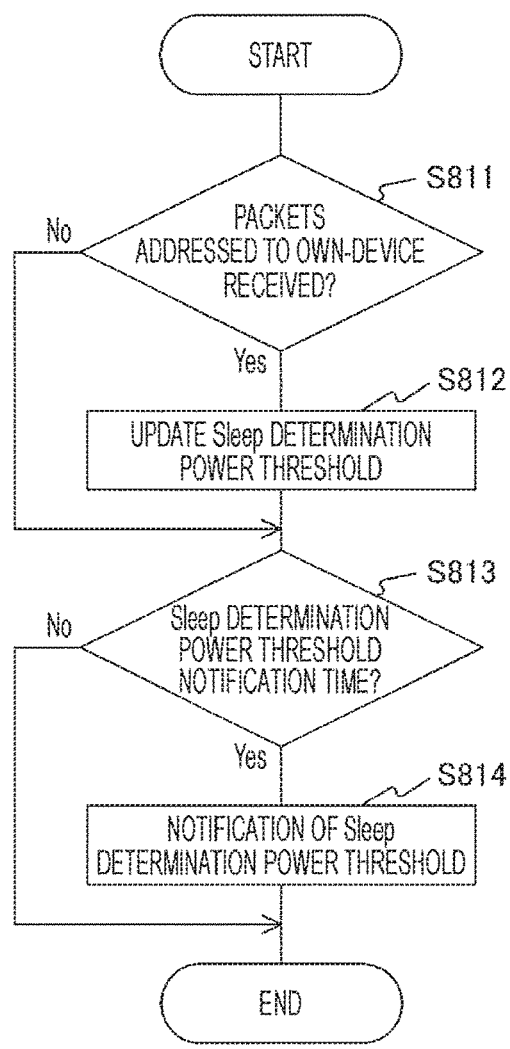
FIG. 8 is a flowchart showing an example of processing procedures of a sleep determination power threshold update process and a sleep determination power threshold notification process performed by the information processing device 100 according to the embodiment of the present technology.

Note that the example herein is an example of acquiring predicted reception power of a desired packet and a sleep determination power threshold for every reception of a packet. However, predicted reception power of a desired packet and a sleep determination power threshold may be acquired at different timing. For example, predicted reception power of a desired packet and a sleep determination power threshold may be acquired at the time of reception of a packet addressed to the own-device. FIG. 8 shows this example.

Alternatively, in case of the information processing device 100 constituting a slave station, for example, predicted reception power of a desired packet and a sleep determination power threshold may be acquired at the time of reception of a beacon from a master station. Alternatively, for example, predicted reception power of a desired packet and a sleep determination power threshold may be acquired after an elapse of a predetermined period, or at the time of reception of a predetermined number of packets.

Alternatively, in case of the information processing device 100 constituted by a cellular phone, for example, predicted reception power of a desired packet and a sleep determination power threshold may be acquired at the time of detection of movement of the information processing device 100. Note that the movement of the information processing device 100 (movement of position of information processing device 100) is detectable on the basis of a sensor for detecting a condition of the information processing device 100 (e.g. built-in sensor of information processing device 100). For example, this sensor may be constituted by a gyro sensor, an acceleration sensor, a global positioning system (GPS) sensor, or other sensors. Alternatively, for example, predicted reception power of a desired packet and a sleep determination power threshold may be acquired at the time of detection of movement of a communication partner device of the information processing device 100. In this case, the movement of the communication partner device is detectable by the information processing device 100 with reference to notification from the communication partner device (e.g. exchange of signal including information indicating movement).

Alternatively, in case of the information processing device 100 constituting a slave station, and constituted by a portable device, for example, predicted reception power of a desired packet and a sleep determination power threshold may be acquired at the time of a distance change between the information processing device 100 and a master station. This distance change is detectable on the basis of a change of reception power of a beacon from a master station, or sensor information received from the respective sensors described above, for example.

As described above, the control unit 160 may update a sleep determination power threshold in case of detection of movement of the information processing device 100 or the first device (e.g. communication partner of information processing device 100). Alternatively, the control unit 160 may update the sleep determination power threshold in case of a change of a relative positional relationship between the information processing device 100 and the first device.

In addition, predicted reception power of a desired packet and a sleep determination power threshold may be acquired at times different from each other, for example.

[Communication Example of Sleep Determination Power Threshold Notification Packet]

Figure 7:
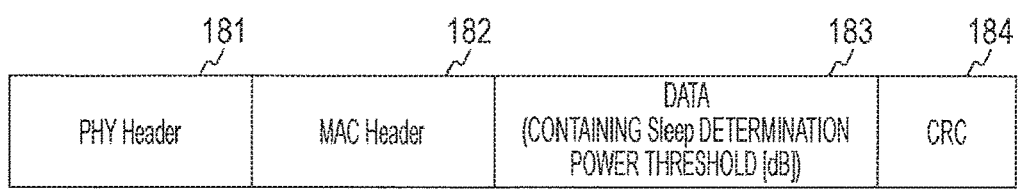
FIG. 7 is a diagram showing a configuration example of a sleep determination power threshold notification packet to be transmitted and received by the information processing device 100 according to the embodiment of the present technology.

FIG. 7 is a diagram illustrating a configuration example of a sleep determination power threshold notification packet to be transmitted and received by the information processing device 100 according to the embodiment of the present technology.

The sleep determination power threshold notification packet is constituted by a PHY header 181, a MAC header 182, DATA 183, and CRC 184. FIG. 7 shows an example of the DATA 183 storing a sleep determination power threshold.

As described above, the control unit 160 of the information processing device 100 transmits a determined sleep determination power threshold contained in a sleep determination power threshold notification packet to notify a communication partner about the sleep determination power threshold set for the own-device. A device having received the sleep determination power threshold notification packet is capable of transmitting a packet with reference to the sleep determination power threshold contained in the sleep determination power threshold notification packet in case of transmission of the packet to the information processing device 100. For example, the device having received the sleep determination power threshold notification packet is capable of controlling transmission power level for packet transmission to the information processing device 100 on the basis of the sleep determination power threshold contained in the sleep determination power threshold notification packet.

[Operation Example of Information Processing Device]

FIG. 8 is a flowchart showing an example of processing procedures of a sleep determination power threshold update process and a sleep determination power threshold notification process performed by the information processing device 100 according to the embodiment of the present technology.

FIG. 8 shows an example of updating a sleep determination power threshold by the information processing device 100 for every reception of a packet addressed to the own-device. Updating is performed by using reception power of the packet addressed to the own-device with reference to the received packet as a reference signal. By updating the sleep determination power threshold for every reception of a packet addressed to the own-device as described above, accurate estimation of reception power of a desired packet is realizable in a manner following fluctuations of an environment for the information processing device 100.

FIG. 8 also shows an example of notifying a communication partner about the updated sleep determination power threshold at intervals of a predetermined period. By this method, the communication partner is notified about the latest sleep determination power threshold at appropriate timing.

Initially, the control unit 160 of the information processing device 100 determines whether or not a packet addressed to the own-device has been received (step S811). In case of determination that no packet addressed to the own-device has been received (step S811), the flow proceeds to step S813.

In case of determination that a packet addressed to the own-device has been received (step S811), the control unit 160 updates a sleep determination power threshold (step S812). More specifically, the control unit 160 acquires predicted reception power of a desired packet, and determines a sleep determination power threshold on the basis of the predicted reception power of the desired packet.

Subsequently, the control unit 160 determines whether or not the current time is a notification time about the sleep determination power threshold (step S813). This notification time may be set by a user operation, or may be automatically set by an external device, for example. Alternatively, the notification time may be automatically set in accordance with an environment for the information processing device 100, or other conditions. In case of determination that the current time is not the notification time of the sleep determination power threshold (step S813), operations of the sleep determination power threshold update process and the sleep determination power threshold notification process end.

In case of determination that the current time is the notification time of the sleep determination power threshold (step S813), the control unit 160 transmits a sleep determination power threshold notification packet containing a latest sleep determination power threshold (step S813).

As described above, the control unit 160 is capable of updating the sleep determination power threshold for every reception of a reference signal from the first device (communication partner of information processing device 100).

Note that FIG. 8 shows an example of transmitting the sleep determination power threshold notification packet at intervals of a predetermined period. However, the sleep determination power threshold notification packet may be transmitted at different timing. For example, the sleep determination power threshold notification packet may be transmitted at the time of update of the sleep determination power threshold. Alternatively, in case of the information processing device 100 constituting a master station, for example, the sleep determination power threshold notification packet may be transmitted at the time of transmission of a beacon. In this case, the beacon to be transmitted may be transmitted as the sleep determination power threshold notification packet.

Accordingly, reduction of power consumption during standby of a device, and maximization of system throughput are both realizable in wireless packet communication according to the embodiment of the present technology. More specifically, the state is appropriately switchable between the packet detection state (listen state) 303 and the sleep state 304 shown in FIG. 2 on the basis of reception power of a packet addressed to a different device (packet not addressed to own-device).

Furthermore, the information processing device 100 according to the embodiment of the present technology is applicable to devices in various fields. For example, the information processing device 100 is applicable to wireless devices provided inside an automobile (e.g. car navigation system and smartphone). Moreover, for example, the information processing device 100 is applicable to learning aid devices used in educational fields (e.g. tablet-type terminal). Furthermore, for example, the information processing device 100 is applicable to wireless devices used in agricultural fields (e.g. terminal of cow management system). Similarly, for example, the information processing device 100 is applicable to respective wireless devices used in sporting fields, medical fields and others.

2. Application Example

The technology according to the present disclosure is applicable to various types of products. For example, the information processing device 100 may be practiced in the form of a smartphone, a tablet-type personal computer (PC), a laptop, a mobile terminal such as a portable game console and a digital camera, a television receiver, a printer, a stationary terminal such as a digital scanner and a network storage, or an in-vehicle terminal such as a car navigation device. Alternatively, the information processing device 100 may be practiced in the form of a smart meter, a vending machine, a remote monitoring device, or a terminal performing machine to machine (M2M) communication (also referred to as machine type communication (MTC) terminal) such as a point of sale (POS) terminal. Alternatively, the information processing device 100 may be a wireless communication module mounted on these terminals (e.g. integrated circuit module constituted by one die).

On the other hand, the information processing device 100 may be practiced in the form of a wireless LAN access point (also referred to as wireless base station) which has or does not have a router function. Alternatively, the information processing device 100 may be practiced in the form of a mobile wireless LAN router. Alternatively, the information processing device 100 may be a wireless communication module mounted on these devices (e.g. integrated circuit module constituted by one die).

2-1. First Application Example

Figure 9:
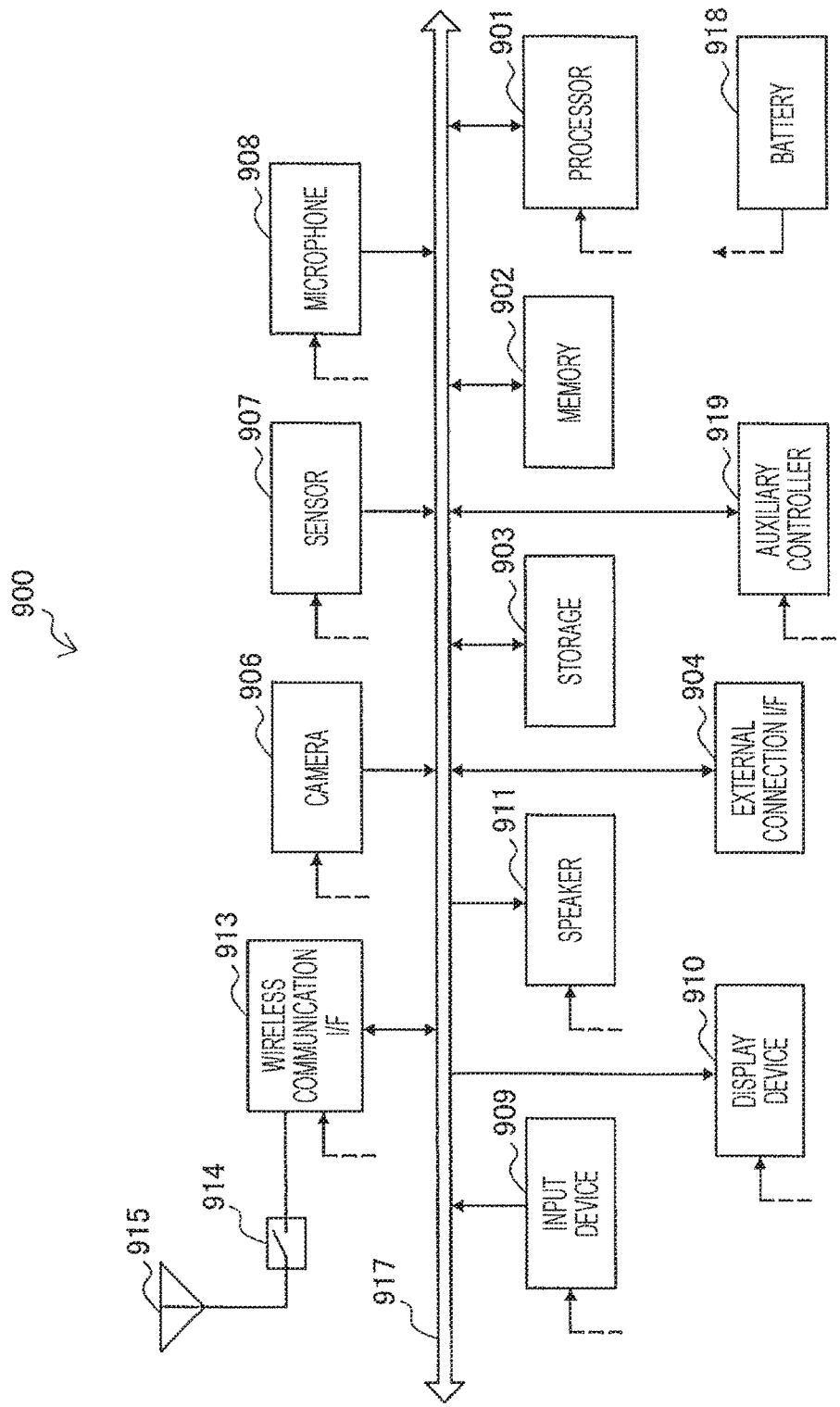
FIG. 9 is a block diagram showing an example of a general configuration of a smartphone.

FIG. 9 is a block diagram showing an example of a general configuration of a smartphone 900 to which the technology according to the present disclosure is applicable. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

For example, the processor 901 may be constituted by a central processing unit (CPU) or a system on chip (SoC), and controls functions of application layers or other layers of the smartphone 900. The memory 902 includes a random access memory (RAM) and a read only memory (ROM), and stores programs executed by the processor 901 and data. The storage 903 may include a storage medium such as a semiconductor memory and a hard disk. The external connection interface 904 is an interface for connecting an external device such as a memory card or a universal serial bus (USB) device to the smartphone 900.

The camera 906 includes an imaging device such as a charge coupled device (CCD) and a complementary metal oxide semiconductor (CMOS), and forms a captured image. The sensor 907 may include a sensor group such as a positioning sensor, a gyro sensor, a geomagnetic sensor, and an acceleration sensor. The microphone 908 converts voices input to the smartphone 900 into audio signals. The input device 909 includes a touch sensor for detecting a touch to a screen of the display device 910, a keypad, a keyboard, buttons, and switches, for example, and receives operations or information input from a user. The display device 910 includes a screen such as a liquid crystal display (LCD) and an organic light emitting diode (OLED) display, and displays an output image from the smartphone 900. The speaker 911 converts audio signals input from the smartphone 900 into voices.

The wireless communication interface 913 supports one or more of wireless LAN standards such as IEEE 802.11a, 11b, 11g, 11n, 11 ac, and 11ad, and executes wireless communication. The wireless communication interface 913 may communicate with other devices via wireless LAN access points in an infrastructure mode. In addition, the wireless communication interface 913 may directly communicate with other devices in a direct communication mode such as ad hoc mode and Wi-Fi Direct. Note that one of two terminals operates as an access point in Wi-Fi Direct unlike the ad hoc mode. However, communication is directly executed between these terminals. Typically, the wireless communication interface 913 may include a baseband processor, a radio frequency (RF) circuit, a power amplifier and the like. The wireless communication interface 913 may be a one-chip module which integrates a memory storing a communication control program, a processor executing this program, and associated circuits. The wireless communication interface 913 may support other types of wireless communication system such as a short-range wireless communication system, a close wireless communication system, and a cellular communication system, as well as the wireless LAN system. Then antenna switch 914 switches connection of the antenna 915 between a plurality of circuits included in the wireless communication interface 913 (such as circuits for different wireless communication systems). The antenna 915 includes a single or a plurality of antenna elements (such as a plurality of antenna elements constituting MIMO antenna) used for wireless signal transmission and reception via the wireless communication interface 913.

Note that the configuration of the smartphone 900 is not limited to the example shown in FIG. 9, but may include a plurality of antennas (e.g. antennas for wireless LAN and antennas for near wireless communication system). In this case, the antenna switch 914 may be eliminated from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to each other. The battery 918 supplies power to the respective blocks of the smartphone 900 shown in FIG. 9 via power supply lines partially indicated by broken lines in the figure. The auxiliary controller 919 secures operations associated with minimum necessary functions of the smartphone 900 in a sleep mode, for example.

The control unit 160 described with reference to FIG. 1 may be mounted on the wireless communication interface 913 in the smartphone 900 shown in FIG. 9. In addition, at least a part of the functions of the smartphone 900 may be incorporated in the processor 901 or the auxiliary controller 919. For example, power consumption of the battery 918 decreases under the packet monitoring control described above.

Note that the smartphone 900 may operate as a wireless access point (software AP) by an application-level access point function executed by the processor 901. Alternatively, the wireless access point function may be performed by the wireless communication interface 913.

2-2. Second Application Example

Figure 10:
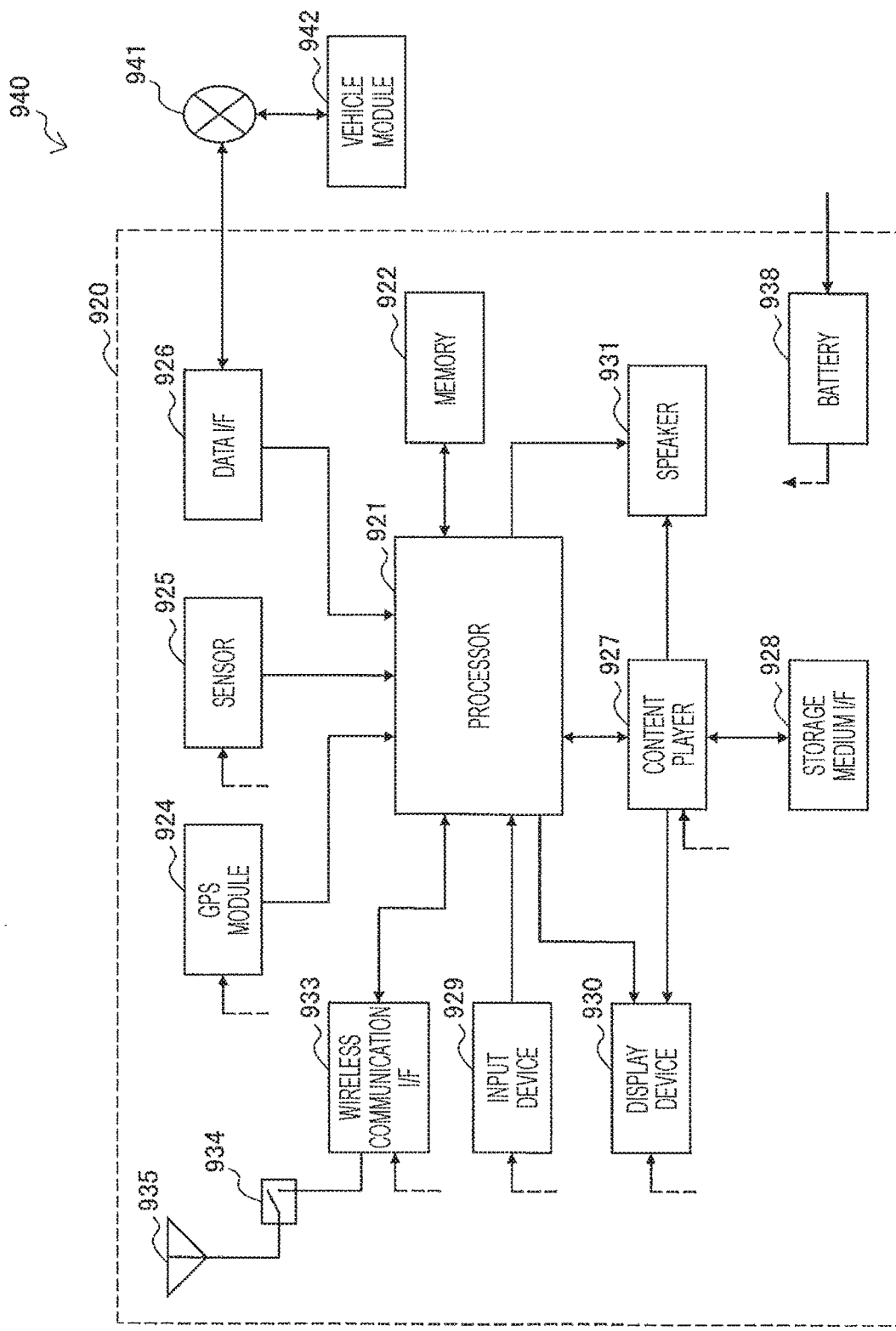
FIG. 10 is a block diagram showing an example of a general configuration of a car navigation device.

FIG. 10 is a block diagram showing an example of a general configuration of a car navigation device 920 to which the technology according to the present disclosure is applicable. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be constituted by a CPU or an SoC, and controls a navigation function and other functions of the car navigation device 920. The memory 922 includes a RAM and a ROM, and stores programs executed by the processor 921 and data.

The GPS module 924 measures a position of the car navigation device 920 (such as latitude, longitude, and altitude) on the basis of GPS signals received from a GPS satellite. For example, the sensor 925 may include a sensor group such as a gyro sensor, a geomagnetic sensor, and a pressure sensor. The data interface 926 is connected to an in-vehicle network 941 via a not-shown terminal to obtain data generated by a vehicle such as vehicle speed data.

The content player 927 reproduces content stored in a storage medium (such as CD and DVD) inserted into the storage medium interface 928. For example, the input device 929 includes a touch sensor for detecting a touch to a screen of the display device 930, buttons, switches and the like, and receives operations or information input from a user. The display device 930 includes a screen such as an LCD display and an OLED display, and displays navigation functions or images of content to be reproduced. The speaker 931 outputs navigation functions or voices of content to be reproduced.

The wireless communication interface 933 supports one or more of wireless LAN standards such as IEEE 802.11a, 11b, 11g, 11n, 11ac, and 11ad, and executes wireless communication. The wireless communication interface 933 may communicate with other devices via wireless LAN access points in an infrastructure mode. In addition, the wireless communication interface 933 may directly communicate with other devices in a direct communication mode such as ad hoc mode and Wi-Fi Direct. Typically, the wireless communication interface 933 may include a baseband processor, an RF circuit, a power amplifier and the like. The wireless communication interface 933 may be a one-chip module which integrates a memory storing a communication control program, a processor executing this program, and associated circuits. The wireless communication interface 933 may support other types of wireless communication system such as a short-range wireless communication system, a close wireless communication system, and a cellular communication system, as well as the wireless LAN system. The antenna switch 934 switches connection of the antenna 935 between a plurality of circuits included in the wireless communication interface 933. The antenna 935 includes a single or a plurality of antenna elements used for wireless signal transmission and reception via the wireless communication interface 933.

Note that, the configuration of the car navigation device 920 is not limited to the example shown in FIG. 10, but may include a plurality of antennas. In this case, the antenna switch 934 may be eliminated from the configuration of the car navigation device 920.

The battery 938 supplies power to the respective blocks of the car navigation device 920 shown in FIG. 10 via power supply lines partially indicated by broken lines in the figure. In addition, the battery 938 accumulates power supplied from the vehicle.

The control unit 160 described with reference to FIG. 1 may be mounted on the wireless communication interface 933 in the car navigation device 920 shown in FIG. 10. In addition, at least a part of the functions of the car navigation device 920 may be incorporated in the processor 921.

In addition, the wireless communication interface 933 may function as the information processing device 100 described above to provide wireless connection to a terminal carried by a user on the vehicle.

Furthermore, the technology according to the present disclosure may be realized as an in-vehicle system (or vehicle) 940 which includes one or more blocks of the car navigation device 920 described above, an in-vehicle network 941, and a vehicle module 942. The vehicle module 942 generates vehicle data such as a vehicle speed, an engine speed, and malfunction information, and outputs the generated data to the in-vehicle network 941.

2-3. Third Application Example

FIG. 11 is a block diagram showing an example of a general configuration of a wireless access point 950 to which the technology according to the present disclosure is applicable. The wireless access point 950 includes a controller 951, a memory 952, an input device 954, a display device 955, a network interface 957, a wireless communication interface 963, an antenna switch 964, and an antenna 965.

The controller 951 may be constituted by a CPU or a digital signal processor (DSP), for example, and performs various functions of layers higher than an Internet protocol (IP) of the wireless access point 950 (such as access limitation, routing, encryption, fire wall, and log management). The memory 952 includes a RAM and a ROM, and stores programs executed by the controller 951, and various types of control data (such as terminal list, routing table, encryption key, security setting, and log).

The input device 954 includes buttons, switches or the like, and receives an operation from a user. The display device 955 includes an LED lamp or the like, and displays an operation status of the wireless access point 950.

The network interface 957 is a wired communication interface providing connection between the wireless access point 950 and a wired communication network 958. The network interface 957 may include a plurality of connection terminals. The wired communication network 958 may be a LAN such as Ethernet (registered trademark), or may be a wide area network (WAN).

The wireless communication interface 963 supports one or more of wireless LAN standards such as IEEE 802.11a, 11b, 11g, 11n, 11ac, and 11ad, and provides wireless connection as an access point to a near terminal. Typically, the wireless communication interface 963 may include a baseband processor, an RF circuit, a power amplifier and the like. The wireless communication interface 963 may be a one-chip module which integrates a memory storing a communication control program, a processor executing this program, and associated circuits. The antenna switch 964 switches connection of the antenna 965 between a plurality of circuits included in the wireless communication interface 963. The antenna 965 includes a single or a plurality of antenna elements used for wireless signal transmission and reception via the wireless communication interface 963.

The control unit 160 described with reference to FIG. 1 may be mounted on the wireless communication interface 963 in the wireless access point 950 shown in FIG. 11. In addition, at least a part of the functions of the wireless access point 950 may be incorporated in the controller 951.

Note that the respective embodiments described above are presented by way of examples for realizing the present technology. Matters included in the embodiments, and specific matters of the invention according to the appended claims are correlated with each other. Similarly, the specific matters of the invention according to the appended claims, and matters to which identical names are given in the embodiments of the present technology are correlated with each other. However, the present technology is not limited to the embodiments herein, but may be realized with various modifications of the embodiments without departing from the subject matters of the embodiments.

In addition, the processing procedures described in the foregoing embodiments may be considered as a method including a series of these procedures, as a program under which a computer executes the series of procedures, or as a recording medium in which the program is stored. The recording medium may be constituted by a compact disc (CD), a minidisc (MD), a digital versatile disc (DVD), a memory card, a Blu-ray (registered trademark) disc, or others.

Note that effects to be produced are not limited to the effects described in the present specification presented only by way of example. Additional effects may be also produced.

Note that the present technology may have following configurations.

(1)
An information processing device including:
a reception unit that receives a packet; and
a control unit that controls a packet monitoring state in case of detection of reception of a packet not addressed to the information processing device, the packet monitoring state being controlled on the basis of reception power of the packet.

(2)
The information processing device according to (1) described above, in which the control unit controls the packet monitoring state on the basis of a comparison result between the reception power of the packet not addressed to the information processing device and a predetermined threshold.

(3)
The information processing device according to (2) described above, in which the control unit determines the threshold on the basis of reception power of a reference signal received from a first device that transmits a packet addressed to the information processing device.

(4)
The information processing device according to (3) described above, in which the control unit determines the threshold by using a latest reference signal included in reference signals received from the first device, or a plurality of reference signals received from the first device.

(5)
The information processing device according to (3) described above, in which the control unit determines the threshold by using a reference signal that has lowest reception power, or a reference signal that has highest reception power in case of presence of a plurality of the first devices.

(6)
The information processing device according to any one of (3) through (5) described above, in which the control unit determines the threshold by using at least any one of a battery residual amount of the information processing device, a volume of data handled by the information processing device, a type of the data, and a communication environment of the information processing device.

(7) The information processing device according to any one of (3) through (6) described above, in which the control unit updates the threshold for every reception of the reference signal from the first device.

(8)
The information processing device according to any one of (3) through (6) described above, in which the control unit updates the threshold in case of detection of movement of the information processing device or the first device.

(9)
The information processing device according to anyone of (2) through (8) described above, in which the control unit brings the packet monitoring state into a sleep state for a period specified on the basis of a size of the packet not addressed to the information processing device in a case where reception power of the packet not addressed to the information processing device is high with respect to the threshold.

(10)
The information processing device according to (9) described above, in which the control unit brings the packet monitoring state into the sleep state for at least a period until an end of the packet not addressed to the information processing device.

(11)
The information processing device according to (9) described above, in which the control unit brings the packet monitoring state into the sleep state for a period of a sum of a period until an end of the packet not addressed to the information processing device and a predetermined period.

(12)
The information processing device according to (11) described above, in which the predetermined period is a value that corresponds to any one of short inter frame space (short IFS) (SIFS), DCF IFS (DIFS), and a transmission period of a response signal for the packet not addressed to the information processing device.

(13)
The information processing device according to any one of (10) through (12) described above, in which the control unit specifies the end of the packet not addressed to the information processing device on the basis of length stored in a physical layer (PHY) header of the packet not addressed to the information processing device.

(14)
The information processing device according to any one of (1) through (13) described above, in which the control unit detects the packet not addressed to the information processing device on the basis of Basic Service Set (BSS) Color contained in a PHY header of the received packet.

(15)
The information processing device according to anyone of (2) through (13) described above, in which the control unit notifies a first device about the threshold, the first device transmitting a packet addressed to the information processing device.

(16)
An information processing method including:
a detection procedure that detects reception of a packet not addressed to the information processing device; and
a control procedure that controls a packet monitoring state in case of detection of reception of a packet not addressed to the information processing device, the packet monitoring state being controlled on the basis of reception power of the packet.

(17)
A program under which a computer executes:
a detection procedure that detects reception of a packet not addressed to the information processing device; and
a control procedure that controls a packet monitoring state in case of detection of reception of a packet not addressed to the information processing device, the packet monitoring state being controlled on the basis of reception power of the packet.

REFERENCE SIGNS LIST

100, 201 to 203 Information processing device
110 Data processing unit
120 Signal processing unit
130 Wireless interface unit
140 Antenna
150 Storage unit
160 Control unit
900 Smartphone
901 Processor
902 Memory
903 Storage
904 External connection interface
906 Camera
907 Sensor 908 Microphone
909 Input device
910 Display device
911 Speaker
913 Wireless communication interface
914 Antenna switch
915 Antenna
917 Bus
918 Battery
919 Auxiliary controller
920 Car navigation device
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 In-vehicle network
942 Vehicle module
950 Wireless access point
951 Controller
952 Memory
954 Input device
955 Display device
957 Network interface
958 Wired communication network
963 Wireless communication interface
964 Antenna switch
965 Antenna

The invention claimed is:
1. An information processing device comprising:
  circuitry configured to
    receive a packet;
    determine whether or not the received packet is addressed to the information processing device; and
    upon determining that the received packet is not addressed to the information processing device and that a reception power of the received packet exceeds a predetermined value, control the information processing device to be in a second state based on length information included in the received packet,
  wherein power consumption in the second state is different from a power consumption in a first state, the circuitry controlling the information processing device to be in the first state based on determining that the received packet is not addressed to the information processing device and that the reception power of the received packet does not exceed the predetermined value,
  wherein power consumption in the second state is lower than a power consumption in the first state, and
  wherein the first state is one of a packet transmission state or a packet reception state and the second state is a sleep state.
2. The information processing device according to claim 1, wherein the length information is stored in a physical layer (PHY) header of the received packet not addressed to the information processing device.

3. The information processing device according to claim 1, wherein the circuitry is further configured to maintain the information processing device in the second state until an end of the received packet, wherein the end of the received packet is determined based on the length information included in the received packet.
4. The information processing device according to claim 3, wherein the circuitry is further configured to maintain the information processing device in the second state until the end of the received packet plus a predetermined time period.
5. The information processing device according to claim 4, wherein the predetermined time period is a value that corresponds to any one of a short inter frame space (short IFS) (SIFS), a distributed coordination function (DCF) inter frame space (DIFS), or a transmission period of a response signal for the received packet not addressed to the information processing device.
6. The information processing device according to claim 1, wherein the circuitry is further configured to determine if the received packet is addressed to the information processing device based on Basic Service Set (B SS) Color contained in a PHY header of the received packet.
7. The information processing device according to claim 1, wherein the predetermined value is based on a signal different from a signal of the packet.
8. The information processing device according to claim 7, wherein the signal different from the signal of the packet is a reference signal received from a first device.
9. The information processing device according to claim 8, wherein the circuitry is further configured to update the predetermined value for every reception of the reference signal from the first device.
10. The information processing device according to claim 8, wherein the reference signal received from the first device is one of a plurality of reference signals received from the first device.
11. The information processing device according to claim 1, wherein the reference signal is a reference signal of a plurality of first devices that has a lowest reception power, or is a reference signal of the plurality of first devices that has a highest reception power.
12. The information processing device according to claim 1, wherein the circuitry is further configured to update the predetermined value based on a detection of movement of the information processing device or the first device.
13. A method performed by an information processing device, the method comprising:
  receiving a packet;
    determining whether or not the received packet is addressed to the information processing device; and
    upon determining that the received packet is not addressed to the information processing device and that a reception power of the received packet exceeds a predetermined value, controlling the information processing device to be in a second state based on length information included in the received packet,
  wherein power consumption in the second state is different from a power consumption in a first state, the information processing device being controlled to be in the first state based on determining that the received packet is not addressed to the information processing device and that the reception power of the received packet does not exceed the predetermined value,
  wherein power consumption in the second state is lower than a power consumption in the first state, and wherein the first state is one of a packet transmission state or a packet reception state, and the second state is a sleep state.

14. The method according to claim 13, wherein the predetermined value is based on a signal different of a signal of the packet.

15. A non-transitory computer readable medium containing instructions for causing an information processing device to perform a method, the method comprising:
receiving a packet;
determining whether or not the received packet is addressed to the information processing device; and
upon determining that the received packet is not addressed to the information processing device and that a reception power of the received packet exceeds a predetermined value, controlling the information processing device to be in a second state based on length information included in the received packet,
wherein power consumption in the second state is different from a power consumption in a first state, the information processing device being controlled to be in the first state based on determining that the received packet is not addressed to the information processing device and that the reception power of the received packet does not exceed the predetermined value,
wherein power consumption in the second state is lower than a power consumption in the first state, and
wherein the first state is one of a packet transmission state or a packet reception state, and the second state is a sleep state.

16. The method according to claim 15, wherein the predetermined value is based on a signal different of a signal of the packet.

* * * * *